United States Patent
Lee et al.

(10) Patent No.: US 8,160,522 B2
(45) Date of Patent: Apr. 17, 2012

(54) APPARATUS AND METHOD FOR RECEIVING SIGNAL IN MULTIPLE INPUT MULTIPLE OUTPUT SYSTEM

(75) Inventors: Woo-Yong Lee, Suwon-si (KR); Hyun-Il Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 12/286,335

(22) Filed: Sep. 30, 2008

(65) Prior Publication Data

US 2009/0104884 A1    Apr. 23, 2009

(30) Foreign Application Priority Data

Oct. 19, 2007 (KR) .................. 10-2007-0105459

(51) Int. Cl.
*H04B 7/08* (2006.01)

(52) U.S. Cl. ........ 455/132; 455/133; 455/140; 455/141; 455/231; 455/553.1

(58) Field of Classification Search ............... 455/553.1, 455/103, 132, 133, 137, 140, 141
See application file for complete search history.

(56) References Cited

U.S. PATENT DOCUMENTS

| | | | | |
|---|---|---|---|---|
| 5,917,448 | A * | 6/1999 | Mickelson | 342/442 |
| 6,700,514 | B2 * | 3/2004 | Soltanian et al. | 341/118 |
| 7,324,429 | B2 * | 1/2008 | Walton et al. | 370/203 |
| 7,369,877 | B2 * | 5/2008 | Reilly et al. | 455/561 |
| 7,460,615 | B2 * | 12/2008 | Kunysz et al. | 375/316 |
| 2002/0154687 | A1 * | 10/2002 | Bierly et al. | 375/222 |
| 2004/0082356 | A1 * | 4/2004 | Walton et al. | 455/522 |
| 2004/0121753 | A1 * | 6/2004 | Sugar et al. | 455/333 |
| 2004/0234012 | A1 | 11/2004 | Rooyen | |
| 2004/0242183 | A1 * | 12/2004 | Sugar et al. | 455/333 |
| 2007/0025478 | A1 * | 2/2007 | Koga | 375/345 |
| 2007/0121768 | A1 | 5/2007 | Rooyen | |

FOREIGN PATENT DOCUMENTS

KR    10-2004-0030280    4/2004

\* cited by examiner

*Primary Examiner* — Duc M Nguyen

(57) ABSTRACT

A receiving apparatus and method of a Multiple Input Multiple Output (MIMO) system are provided. The receiving apparatus includes a clock generation/delay compensation unit for generating a clock, an antenna switching unit for temporally dividing signals received through multiple antennas by performing switching according to the clock, a radio frequency (RF) chain to be shared for converting the temporally divided signals into baseband signals, and an analog to digital converter (ADC) to be shared for converting the converted signals into digital signals and for outputting the converted signals according to the clock. Accordingly, the number of RF chains used to implement a MIMO RFIC is reduced.

21 Claims, 5 Drawing Sheets

APPARATUS AND METHOD FOR RECEIVING SIGNAL IN MULTIPLE INPUT MULTIPLE OUTPUT SYSTEM

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Oct. 19, 2007 and assigned Serial No. 2007-105459, the entire disclosure of which is hereby incorporated by reference.

TECHNICAL FIELD OF THE INVENTION

The present invention relates to a Multiple Input Multiple Output (MIMO) system. More particularly, the present invention relates to an apparatus and method for receiving a signal by simplifying a structure of a radio frequency (RF) chain constituting a MIMO system in order to achieve a low chip cost and power saving.

BACKGROUND OF THE INVENTION

A Single Input Single Output (SISO) technique is used in 1st Generation (1G) to 3rd Generation (3G) cellular wireless communications. The SISO technique uses one antenna between transmitting and receiving ends. On the other hand, to increase a data rate by utilizing limited frequency resources and bandwidths, in a post-3.5G wireless communication technique, a Multiple Input Multiple Output (MIMO) technique for improving a spectral efficiency (bits/Hz) by using multiple antennas is commercialized. In particular, as one of representative core technologies of 4G wireless communications, the MIMO technique is provided under the premise that multiple antennas must be supported by configuring multiple radio frequency (RF) chains constituting a mobile station (MS) and a base station (BS).

In a system using the MIMO technique, an entire data stream to be transmitted is divided into several data streams. The divided data streams are individually modulated and are simultaneously transmitted with the same frequency through respective transmit (Tx) antennas and RF chains. In this case, reflected multi-path signals are utilized to improve transmission characteristics, which is the MIMO technique. Respective receive (Rx) antennas and RF chains receive multiple Tx data streams through the multi-path signals. The received data streams are restored by using a MIMO algorithm calculated based on Tx/Rx channel state information.

A 2×2 down link (DL) MIMO system has a structure as follows. When signals are received as multi-path signals from a transmitter through two Rx antennas, a receiver delivers the signals to a baseband modem through independent RF chains and an analog to digital converter (ADC). Referring to FIG. 1, when a transmitter transmits a data stream 1 through a $1^{st}$ Tx RF chain 101-1 and a $1^{st}$ Tx antenna 103-1 and transmits a data stream 2 through a $2^{nd}$ Tx RF chain 101-2 and a 2nd Tx antenna 103-2, a 1st Rx antenna 105-1 of a receiver delivers a data stream 1' and a data stream 2' to a baseband modem (not shown) through a $1^{st}$ Rx RF chain 107-1 and a $1^{st}$ ADC (not shown). Further, a $2^{nd}$ Rx antenna 105-2 of the receiver delivers a data stream 1" and a data stream 2" to the baseband modem (not shown) through a 2nd Rx RF chain 107-2 and a $2^{nd}$ ADC (not shown). In this case, the baseband modem (not shown) separates input signals into streams to restore the original data streams 1 and 2.

It is important herein that two independent Rx RF chains and antennas are required to implement a 2×2 MIMO system. Each Rx RF chain includes a low noise amplifier (LNA), an in-phase/quadrature (I/Q) demodulator, a mixer, an analog filter, an automatic gain controller (AGC) amplifier, and so forth. The data streams 1 and 2 can be separated and restored when signals, which are not electrically mixed, are delivered to the baseband modem through the two independent Rx RF chains and antennas. The signals cannot be delivered by sharing one antenna and one RF chain. Accordingly, an additional RF chain causes more power consumption. Further, a die size of a radio frequency integrated circuit (RFIC) increases. In general, the analog filter and the ADC occupy 50% of the die size of the RFIC. In addition, the additional RF chain consumes power of at least 100 mW. The increase in the die size of the RFIC results in a high chip cost, which may have a significant effect on the costs of constitutional parts of MSs and equipments when a 4×4 MIMO system is implemented in the future.

Accordingly, there is a need for a method capable of achieving a low chip cost and power saving by simplifying a structure of an RF chain constituting the MIMO system.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention is to provide an apparatus and method for receiving a signal in a Multiple Input Multiple Output (MIMO) system.

Another aspect of the present invention is to provide an apparatus and method for receiving a signal by simplifying a structure of a Radio Frequency (RF) chain constituting a MIMO system in order to achieve a low chip cost and power saving.

According to an aspect of the present invention, a receiving apparatus of a MIMO system is provided. The apparatus includes a clock generation/delay compensation unit for generating a clock, an antenna switching unit for temporally dividing signals received through multiple antennas by performing switching according to the clock, an RF chain to be shared for converting the temporally divided signals into baseband signals, and an analog to digital converter (ADC) to be shared for converting the converted signals into digital signals and for outputting the converted signals according to the clock.

According to another aspect of the present invention, a receiving method of a MIMO system is provided. The method includes temporally dividing signals received through multiple antennas by performing switching according to a clock, and converting the temporally divided signals into baseband signals and digital signals by sharing an RF chain and an ADC.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Multiple Input Multiple Output (MIMO) system.

Hereinafter, an apparatus and method for receiving a signal by simplifying a structure of a radio frequency (RF) chain constituting a Multiple Input Multiple Output (MIMO) system in order to achieve a low chip cost and power saving will be described.

Although a 2×2 MIMO system will be described as an example in the following description, the present invention can also apply to all multiple antenna systems. In addition, the receiving apparatus of the present invention may be a MIMO RF receiver of a mobile station (MS) or a base station (BS) and may apply to a Time Division Duplex (TDD) system or a Frequency Division Duplex (FDD) system or a TDD/FDD combination system.

Figure 1:
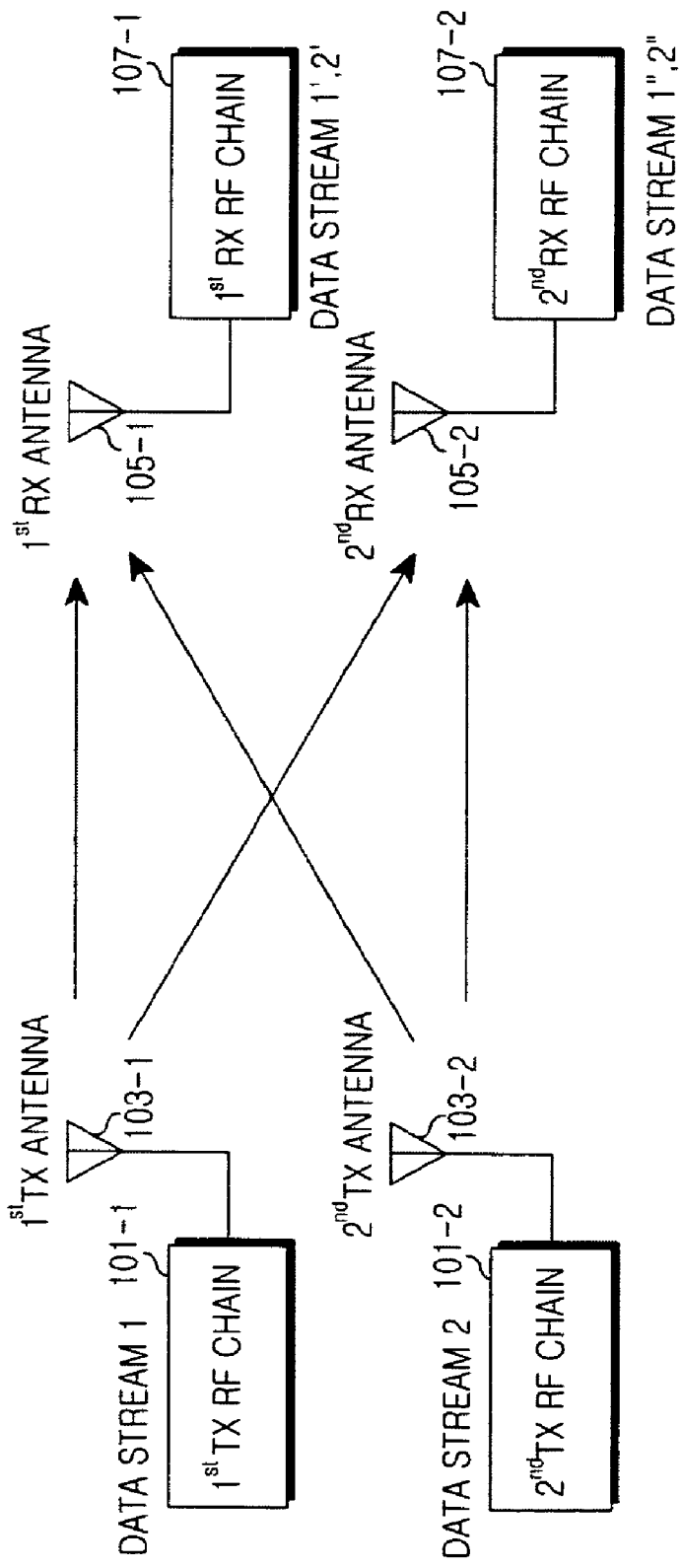
FIG. 1 illustrates multi-pass data streams transmitted and received in a conventional 2×2 Multiple Input Multiple Output (MIMO) system.
Figure 2:
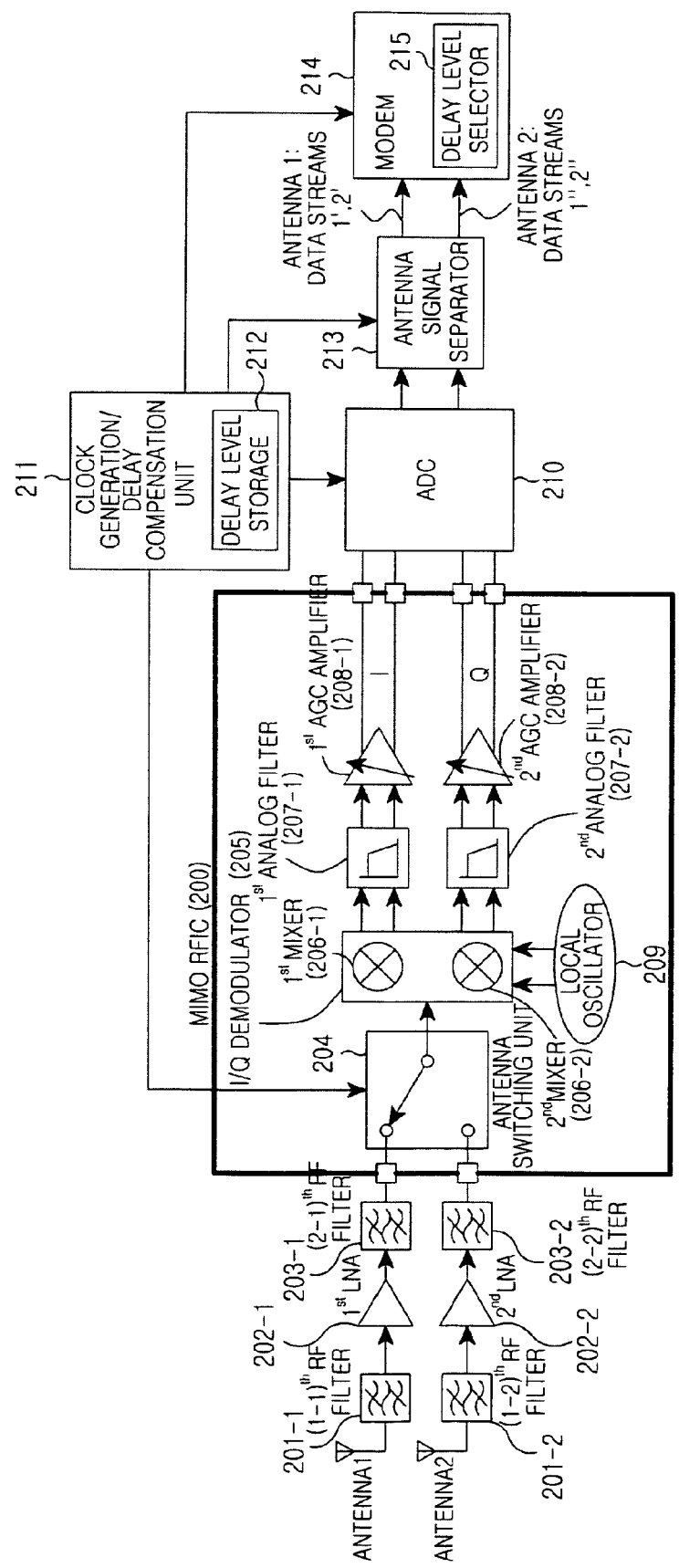
FIG. 2 is a block diagram illustrating a simplified structure of a receiving apparatus in a MIMO system according to an exemplary embodiment of the present invention.

FIG. 2 is a block diagram illustrating a simplified structure of a receiving apparatus in a MIMO system according to an exemplary embodiment of the present invention.

Referring to FIG. 2, the receiving apparatus includes a $(1-1)^{th}$ RF filter 201-1, a 1st low noise amplifier (LNA) 202-1, and a $(2-1)^{th}$ RF filter 203-1, each of which are connected to an antenna 1, and also includes a $(1-2)^{th}$ RF filter 201-2, a $2^{nd}$ LNA 202-2, and a $(2-2)^{th}$ RF filter 203-2, each of which are connected to an antenna 2. Further, the receiving apparatus includes a MIMO radio frequency integrated circuit (RFIC) 200, an analog to digital converter (ADC) 210, a clock generation/delay compensation unit 211, an antenna signal separator 213, and a modem 214. The MIMO RFIC 200 includes an antenna switching unit 204, an in-phase/quadrature (I/Q) demodulator 205, 1st and 2nd mixers 206-1 and 206-2, 1st and 2nd analog filters 207-1 and 207-2, 1st and $2^{nd}$ automatic gain controller (AGC) amplifiers 208-1 and 208-2, and a local oscillator 209. The modem 214 includes a delay level selector 215. The clock generation/delay compensation unit 211 includes a delay level storage 212.

Referring to FIG. 2, the (1-1) th RF filter 201-1 filters data steams 1 and 2 are received from a transmitting apparatus through two Tx antennas according to a corresponding frequency band. The 1st LNA 202-1 performs low-noise amplification on a signal received from the $(1-1)^{th}$ RF filter 201-1. The $(2-1)^{th}$ RF filter 203-1 filters a signal received from the $1^{st}$ LNA 202-1 according to a corresponding frequency.

The $(1-2)^{th}$ RF filter 201-2 filters data streams 1 and 2 received from the transmitting apparatus through the two Tx antennas according to a corresponding frequency band. The $2^{nd}$ LNA 202-2 performs low-noise amplification on a signal received from the $(1-2)^{th}$ RF filter 201-2. The $(2-2)^{th}$ RF filter 203-2 filters a signal received from the $2^{nd}$ LNA 202-2 according to a corresponding frequency band.

The antenna switching unit 204 alternately performs high speed switching on signals received from the $(2-1)^{th}$ RF filter 203-1 and the $(2-2)^{th}$ RF filter 203-2 according to an antenna switching clock input from the clock generation/delay compensation unit 211. That is, the antenna switching unit 204 outputs the signals by separating the signals with Time Division Multiplexing (TDM).

The I/Q demodulator 205 includes the $1^{st}$ and $2^{nd}$ mixers 206-1 and 206-2. The 1st and 2nd mixers 206-1 and 206-2 mix signals received from the antenna switching unit 204 with a local oscillator frequency signal and thus generates I and Q signals. The local oscillator 209 generates the local oscillator frequency signal and provides the generated signal to the I/Q demodulator 205.

The 1st analog filter 207-1 performs analog filtering on the I signal received from the I/Q demodulator 205. The $2^{nd}$ analog filter 207-2 performs analog filtering on the Q signal received from the I/Q demodulator 205. The 1st AGC amplifier 208-1 amplifies the I signal received from the 1st analog filter 207-1 according to a variable gain. The $2^{nd}$ AGC amplifier 208-2 amplifies the Q signal received from the 2nd analog filter 207-2 according to the variable gain.

The ADC 210 converts the I and Q signals received from the $1^{st}$ and 2nd AGC amplifiers 208-1 and 208-2 into digital signals, and outputs the digital signals according to an ADC sampling clock input from the clock generation/delay compensation unit 211.

Figure 3:
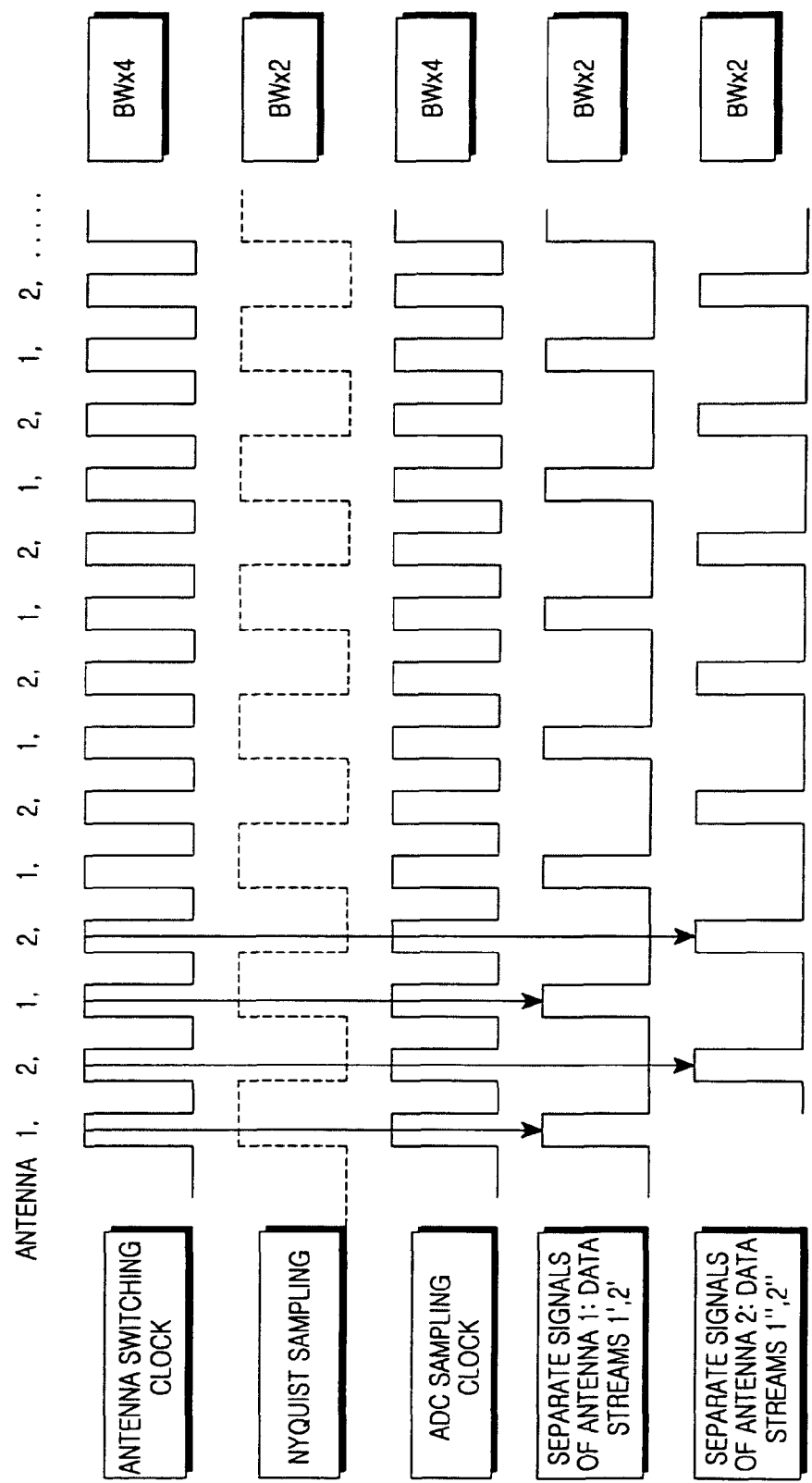
FIG. 3 is a timing diagram illustrating a MIMO data stream according to an exemplary embodiment of the present invention.

The clock generation/delay compensation unit 211 generates a clock having a speed two times higher than a speed of Nyquist sampling, and provides the generated clock to the antenna switching unit 204 as the antenna switching clock. Further, the clock generation/delay compensation unit 211 provides the generated clock to the ADC 210 as the ADC sampling clock and provides the same clock to the antenna signal separator 213. According to a Nyquist sampling theory, a signal can be generated when a sampling speed is at least two times higher than maximum bandwidth (BW) of that signal. As shown in FIG. 3, the Nyquist sampling has a speed of BW×2 on the basis of the Nyquist sampling theory. The antenna switching clock and the ADC sampling clock have a speed of BW×4 since they have a speed two times higher than the Nyquist sampling speed. The clock generation/delay compensation unit 211 includes the delay level storage 212. By using a delay level stored in the delay level storage 212, the clock generation/delay compensation unit 211 compensates for a delay existing between a signal output from the antenna switching unit 204 and a signal input to the ADC 210. That is, the clock generation/delay compensation unit 211 performs clock synchronization by compensating for a clock delay generated between the antenna switching unit 204 and the ADC 210. The delay level is selected by the modem 214 and is then stored in the delay level storage 212. To select the delay level, the clock generation/delay compensation unit 211 provides the generated ADC sampling clock to the modem 214.

According to the clock provided from the clock generation/delay compensation unit 211, the antenna signal separator 213 outputs signals received from the ADC 210 by separating them for respective Rx antennas. For example, as shown in FIG. 3, a signal input at a $(2N)^{th}$ clock may be separated as a signal of an antenna 1, that is, data streams 1' and 2'. Further, a signal input at a $(2N+1)^{th}$ clock may be separated as a signal of an antenna 2, that is, data streams 1" and 2". The separated signals are equivalent to the RF signals received through the two independent RF chains of FIG. 1.

The modem 214 restores an original signal (i.e., the data streams 1 and 2) from a signal received from the antenna signal separator 213 according to a MIMO algorithm. The modem 214 includes the delay level selector 215. The delay level selector 215 receives the ADC sampling clock from the clock generation/delay compensation unit 211. Then, while sequentially changing delay levels of 1 to 8 with a 1/16 resolution of the ADC sampling clock, the delay level selector 215 provides the sequentially changed delay levels to the clock generation/delay compensation unit 211 by using, for example, a 3-bit serial peripheral interface (SPI). The delay level selector 215 selects a delay level whose bit error rate (BER) is less than a previously selected delay level after data decoding, and stores the selected delay level in the delay level storage 212.

Figure 5:
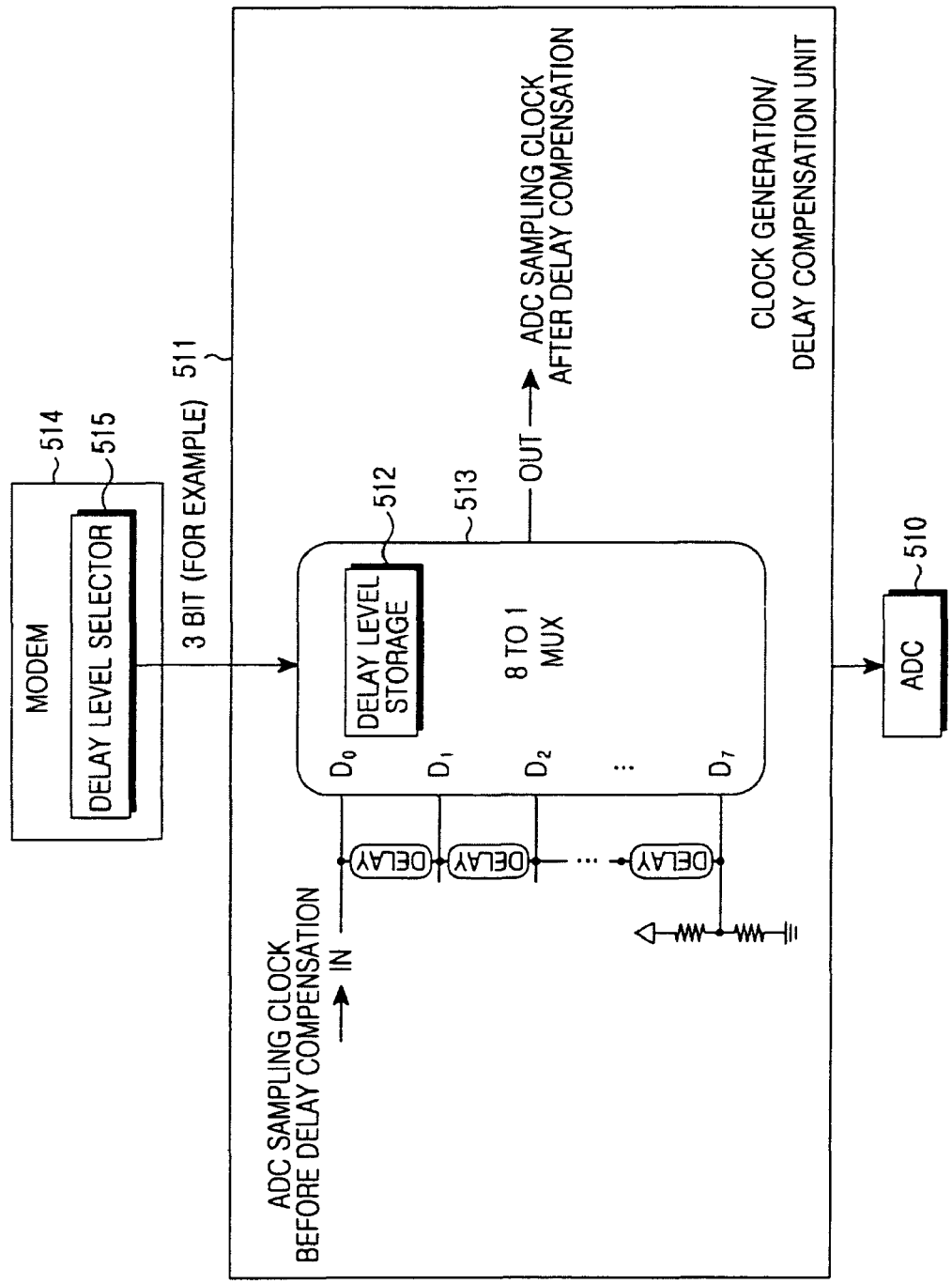
FIG. 5 illustrates a process of selecting a delay level by a modem in a MIMO system according to an exemplary embodiment of the present invention.

Now, a process of selecting a delay level by a modem 514 of FIG. 5 will be described. The modem 514 includes a delay level selector 515. The delay level selector 515 receives an ADC sampling clock from a clock generation/delay compensation unit 511 and sequentially changes delay levels of 1 to 8 with a 1/16 resolution of the ADC sampling clock. Then, the delay level selector 515 provides the sequentially changed delay levels to the clock generation/delay compensation unit 511 by using, for example, a 3-bit SPI.

The clock generation/delay compensation unit 511 generates the ADC sampling clock and provides the generated ADC sampling clock (i.e., an ADC sampling clock before delay compensation) to an input node of one delay line element. The delay line element is a first delay line element among a plurality of delay line elements constituting a delay line. The ADC sampling clock before delay compensation is delayed while passing the first delay line element. Thereafter, the ADC sampling clock is provided to an input node of a next delay line element. Through such a process, the ADC sampling clock passes all delay line elements constituting the delay line. All input nodes of the delay line elements constituting the delay line are connected to corresponding input nodes of an internal 8-to-1 multiplexer (MUX) 513 included in the clock generation/delay compensation unit 511. According to a delay level input from the delay level selector 515 of the modem 514, the 8-to-1 MUX 513 receives a delayed ADC sampling clock from one of the input nodes of the delay line elements constituting the delay line and then outputs the delayed ADC sampling clock to an ADC 510. For example, when a delay level of "001" is input from the delay level selector 515 of the modem 514, the 8-to-1 MUX 513 receives the ADC sampling clock, which has passed one delay line element, through an input node D1 corresponding to the delay level. Then, the 8-to-1 MUX 513 outputs the received ADC sampling clock to the ADC 510.

Thereafter, the delay level selector 515 of the modem 514 selects a delay level whose BER is less than a previously selected delay level after data decoding. Then, the delay level selector 515 stores the selected delay level in a delay level storage 512 included in the clock generation/delay compensation unit 511.

After the selected delay level is stored in the delay level storage 512 in the process described above, according to the delay level stored in the delay level storage 512, the clock generation/delay compensation unit 511 receives the delayed ADC sampling clock from one of the input nodes of the delay line elements constituting the delay line and outputs the received delayed ADC sampling clock to the ADC 510. Accordingly, a delay existing between a signal output from the antenna switching unit 204 of FIG. 2 and a signal input to the ADC 210 of the FIG. 2 can be compensated for. Herein, the delay level selection process may be carried out whenever an MS is powered on or when the MS is manufactured.

Figure 4:
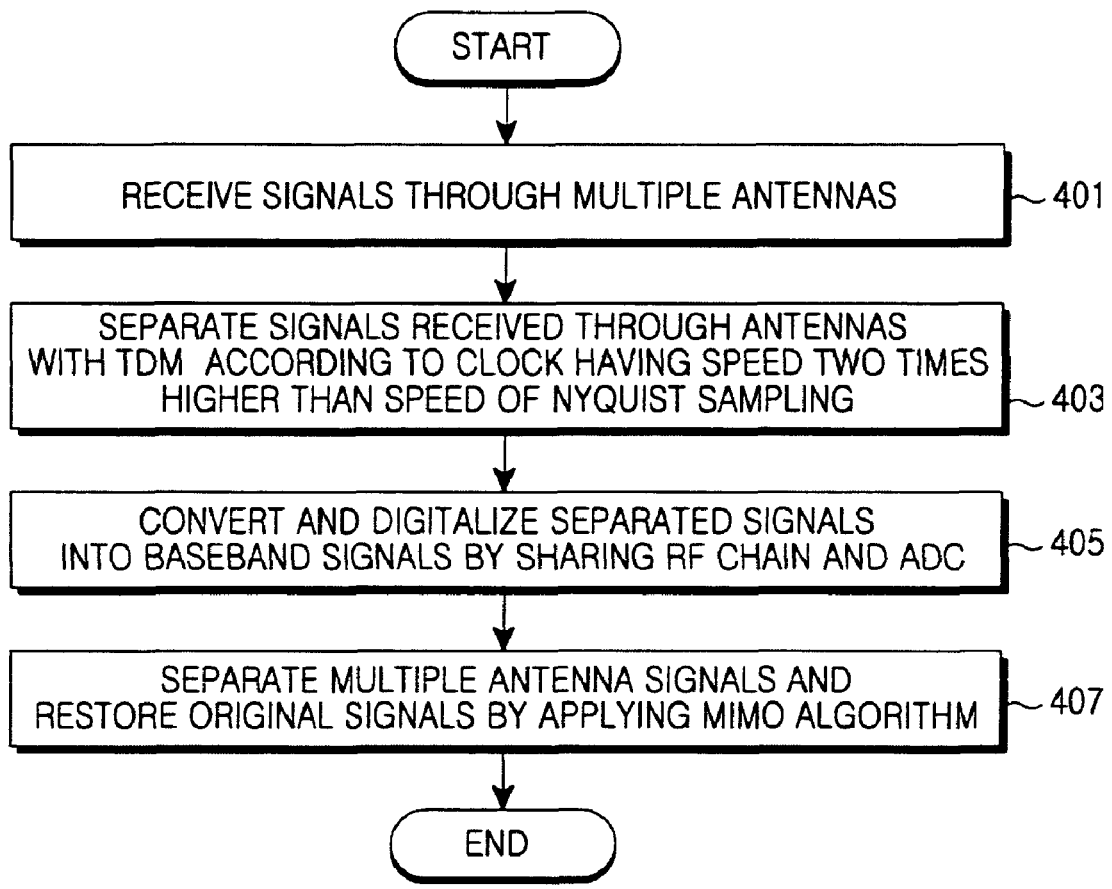
FIG. 4 is a flowchart illustrating a receiving method in a MIMO system according to an exemplary embodiment of the present invention.

FIG. 4 is a flowchart illustrating a receiving method in a MIMO system according to an exemplary embodiment of the present invention.

Referring to FIG. 4, a receiving apparatus receives signals through multiple antennas in step 401.

In step 403, according to a clock having a speed two times higher than a speed of Nyquist sampling, the receiving apparatus alternately performs high speed switching on the signals received through the multiple antennas and thus separates the signals with Time Division Multiplexing (TDM).

In step 405, the receiving apparatus converts and digitalizes the signals separated with TDM into baseband signals by sharing an RF chain and an ADC.

In step 407, the receiving apparatus separates the converted and digitalized signals for respective Rx antennas, and restores original signals by applying a MIMO algorithm to the separated multiple antenna signals.

Thereafter, the procedure of FIG. 4 ends.

According to exemplary embodiments of the present invention, by simplifying a structure of an RF chain constituting a MIMO system, the number of RF chains used to implement a MIMO RFIC is reduced. Therefore, the need for increased power consumption and RFIC die size is prevented. Further, a cause of a high chip cost can be avoided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving apparatus of a Multiple Input Multiple Output (MIMO) system, the apparatus comprising:
  a clock generation/delay compensation unit configured to generate a clock;
  an antenna switching unit configured to temporally divide signals received through multiple antennas by performing switching according to the clock;
  a radio frequency (RF) chain to be shared configured to convert the temporally divided signals into baseband signals;
  an analog to digital converter (ADC) to be shared configured to convert the baseband signals into digital signals and output the digital signals according to the clock;

an antenna signal separator configured to output the converted digital signals by separating the digital signals for the respective antennas according to the clock; and a modem configured to restore separated multiple antenna signals by using a MIMO algorithm and sequentially change delay levels of the clock based on a delay level whose bit error rate (BER) is less than a previously selected delay level after data decoding.

2. The apparatus of claim 1, wherein the clock has a speed at least two times higher than a speed of Nyquist sampling, and the speed of Nyquist sampling is two times higher than a signal bandwidth.

3. The apparatus of claim 1, wherein the RF chain comprises:

an in-phase/quadrature (I/Q) demodulator configured to generate an in-phase (I) signal and a quadrature (Q) signal by mixing the signals received from the antenna switching unit with a local oscillator frequency signal;

an analog filter configured to perform analog filtering on the I and Q signals; and an automatic gain controller (AGC) amplifier configured to amplify the analog filtered signals according to a variable gain.

4. The apparatus of claim 1, further comprising:

a first RF filter, provided for each of receive (Rx) antennas, configured to filter a signal input through one Rx antenna according to a corresponding frequency band;

a low noise amplifier (LNA), provided for each Rx antenna, configured to perform low-noise amplification on the filtered signal; and a second RF filter, provided for each Rx antenna, configured to filter the low-noise amplified signal according to a corresponding frequency band, wherein an output signal of the second RF filter for each Rx antenna is input to the antenna switching unit.

5. The apparatus of claim 1, wherein the modem is further configured to provide the sequentially changed delay levels to the clock generation/delay compensation unit, and wherein the clock generation/delay compensation unit is further configured to output the sequentially changed delay levels to the analog to digital converter by applying the delay levels to the clock provided to the analog to digital converter, and compensate for a clock delay generated between the antenna switching unit and the analog to digital converter by applying the selected delay level to the clock provided to the analog to digital converter when the modem selects the delay level.

6. The apparatus of claim 5, wherein the clock generation/delay compensation unit comprises an internal multiplexer (MUX) and one or more delay line elements constituting a delay line, and input nodes of the delay line elements constituting the delay line are respectively connected to corresponding input nodes of the internal multiplexer.

7. The apparatus of claim 6, wherein, in the clock generation/delay compensation unit, the generated clock is provided to an input node of a first delay line element among the delay line elements constituting the delay line and is delayed while passing the first delay element, the clock is provided to an input node of a next delay line element connected to the first delay line element and is delayed while passing the next delay line, and in this manner, the clock passes all of the delay line elements constituting the delay line.

8. The apparatus of claim 7, wherein, according to the sequentially changed delay levels or the selected delay level, the clock generation/delay compensation unit is further configured to receive a delayed clock from one of the input nodes of the delay line elements constituting the delay line and output the delayed clock to the analog to digital converter.

9. The apparatus of claim 5, wherein the delay level is selected whenever a mobile station (MS) is powered on or when the mobile station is manufactured.

10. The apparatus of claim 5, wherein the delay levels are sequentially changed according to delay levels of 1 to 8 with a $1/16$ resolution.

11. The apparatus of claim 1, wherein the receiving apparatus is a MIMO RF receiver of a mobile station or a base station (BS).

12. The apparatus of claim 1, the receiving apparatus is used in a Time Division Duplex (TDD) system, a Frequency Division Duplex (FDD) or a TDD/FDD combination system.

13. A receiving method of a Multiple Input Multiple Output (MIMO) system, the method comprising:

temporally dividing signals received through multiple antennas by performing switching according to a clock; and converting the temporally divided signals into baseband signals and digital signals by sharing a radio frequency (RF) chain and an analog to digital converter:, separating the converted digital signals for respective receive (Rx) antennas according to the clock;

restoring the separated multiple antenna signals by using a MIMO algorithm; and selecting a delay level whose bit error rate is less than a previously selected delay level after data decoding while sequentially changing delay levels of the clock for controlling the converted signals.

14. The method of claim 13, wherein the clock has a speed more than two times higher than a speed of Nyquist sampling, and the speed of Nyquist sampling is two times higher than a signal bandwidth.

15. The method of claim 13, wherein converting the temporally divided signals into the baseband signals comprises:

generating in-phase (I) and quadrature (Q) signals by mixing the temporally divided signals with a local generator frequency signal;

performing analog filtering on the I and Q signals; and amplifying the analog filtered signals according to a variable gain.

16. The method of claim 13, further comprising, before temporally dividing the signals:

filtering signals received through multiple antennas according to corresponding frequency bands;

performing low-noise amplification on the filtered signals for the respective antennas; and filtering the low-noise amplified signals for the respective antennas according to corresponding frequency bands.

17. The method of claim 13, further comprising outputting the converted signals according to the clock.

18. The method of claim 13, further comprising:

compensating for a clock delay between a clock for controlling the switching and the clock for controlling the converted signals by applying the selected delay level to the clock for controlling the converted signals.

19. The method of claim 18, wherein, in selecting the delay level, the delay level is selected whenever a mobile station is powered on or when the mobile station is manufactured.

20. The method of claim 18, wherein the delay levels are sequentially changed according to delay levels of 1 to 8 with a 1/16 resolution.

21. An apparatus for a Multiple Input Multiple Output (MIMO) system, the apparatus comprising:
- a switching unit configured to temporally divide signals received through multiple antennas by performing switching according to a clock;
- a converter unit configured to convert the temporally divided signals into baseband signals and digital signals by sharing a radio frequency (RF) chain and an analog to digital converter;
- a signal separator configured to separating the converted digital signals for respective receive (Rx) antennas according to the clock: and
- a modem configured to restore restoring the separated multiple antenna signals by using a MIMO algorithm and select a delay level whose bit error rate is less than a previously selected delay level after data decoding while sequentially changing delay levels of the clock for controlling the converted signals.

* * * * *